United States Patent
Gallagher

(10) Patent No.: US 8,384,774 B2
(45) Date of Patent: Feb. 26, 2013

(54) GLASSES FOR VIEWING STEREO IMAGES

(75) Inventor: Andrew C. Gallagher, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 484 days.

(21) Appl. No.: 12/705,650

(22) Filed: Feb. 15, 2010

(65) Prior Publication Data

US 2011/0199460 A1 Aug. 18, 2011

(51) Int. Cl.
*H04N 13/04* (2006.01)
*H04N 9/47* (2006.01)

(52) U.S. Cl. ............................................. 348/60; 348/53

(58) Field of Classification Search ............ 348/51, 348/427, 42, 420, 46, 36, 569, 43, 53, 56, 348/59, 340, 222.1, 60; 382/103, 115, 154
See application file for complete search history.

(56) References Cited

U.S. PATENT DOCUMENTS

| | | | |
|---|---|---|---|
| 5,293,427 A | 3/1994 | Ueno | |
| 5,463,428 A | 10/1995 | Lipton et al. | |
| 6,366,281 B1 | 4/2002 | Lipton et al. | |
| 6,519,088 B1 | 2/2003 | Lipton | |
| 7,180,554 B2 | 2/2007 | Divelbiss | |
| 7,204,592 B2 | 4/2007 | O'Donnell et al. | |
| 7,221,332 B2 | 5/2007 | Miller et al. | |
| 7,369,100 B2 | 5/2008 | Zacks et al. | |
| 7,370,970 B2 | 5/2008 | Hammoud et al. | |
| 8,049,775 B2 * | 11/2011 | Maeda ............................ | 348/47 |
| 2002/0011969 A1 | 1/2002 | Lipton et al. | |
| 2002/0036825 A1 | 3/2002 | Lipton et al. | |
| 2004/0049124 A1 | 3/2004 | Kullok et al. | |
| 2006/0268105 A1 | 11/2006 | Jacobs et al. | |
| 2007/0013624 A1 | 1/2007 | Bourhill | |
| 2007/0126921 A1 | 6/2007 | Gallagher et al. | |
| 2007/0182812 A1 | 8/2007 | Ritchey | |
| 2007/0285419 A1 | 12/2007 | Givon | |
| 2008/0018732 A1 | 1/2008 | Moller | |
| 2008/0170748 A1 | 7/2008 | Albertson et al. | |
| 2008/0204429 A1 | 8/2008 | Silverbrook et al. | |
| 2009/0190095 A1 | 7/2009 | Ellinger et al. | |
| 2009/0322861 A1 * | 12/2009 | Jacobs et al. .................... | 348/53 |
| 2011/0043753 A1 * | 2/2011 | Jacobs et al. ................... | 351/177 |
| 2011/0228215 A1 * | 9/2011 | Jacobs et al. ................... | 351/163 |
| 2012/0092535 A1 * | 4/2012 | Masuno et al. ............... | 348/278 |

(Continued)

FOREIGN PATENT DOCUMENTS

JP 8 190160 A 7/1996
JP 8 331603 A 12/1996

OTHER PUBLICATIONS

Philips, 3D Content Creation Guidelines, http://www.inition.co.uk/inition/pdf/stereovis_philips_content.pdf.

(Continued)

*Primary Examiner* — Behrooz Senfi
(74) *Attorney, Agent, or Firm* — Raymond L. Owens

(57) ABSTRACT

Spectacles are disclosed for use in viewing images or videos, and include at least two lenses each having an adjustable optical property and an image capture device associated with the spectacles for receiving a digital image comprising a plurality of digital image channels each containing multiple pixels. The spectacles further include the image capture device for capturing a digital image and a processor for computing a feature vector from pixel values of the digital image channels wherein the feature vector includes information that would indicate whether the image is an anaglyph or a non-anaglyph image.

12 Claims, 9 Drawing Sheets

U.S. PATENT DOCUMENTS

2012/0176481 A1 * 7/2012 Lukk et al. .................... 348/47

OTHER PUBLICATIONS

Scharstein et al, A Taxonomy and Evaluation of Dense Two-Frame Stereo Correspondence Allorithms, Int. Jour. of Computer Vision, 2002.

Viola et al, Robust Real-time Object Detection, IJCV 2001.

Ideses et al, Three methods that improve visual quality of Color Anaglyphs, Jour. of Optics A: Pure Applied Optics, 2005.

Pavlovic et al, Visual Interpretation of Hand Gesturs for Human-Computer Interaction: A Review, IEEE Trans. pattern Analysis and Machine Intelligence, 1997.

Cootes et al, Active Shape Models—Their Training and Application, CVIU 1995.

Belhumeur et al, Eigenfaces vs. Fisherfaces: Recognition Using Class Specific Linear Projection, PAMI 1997.

Hoiem et al, Automatic Photo Pop-up, ACM SIGGRAPH 2005.

Knorr et al, Super-Resolution Stereo and Multi-View Synthesis from Monocular Video Sequences, 3-D Digital Imaging and Modeling, 3DIM 2007, $6^{th}$ Int. Conf. IEEE Aug. 1, 2007, pp. 55-64.

Torr et al, Feature based methods for structure and motion estimation, Vision Algorithms: Theory and Practice, Int. Workshop on Vision Algorithms, Proc. (Lecture Notes in Comp. Sci. vol. 1883) 2000 pp. 278-294.

Kimura et al, Simultaneous Estimation of Super-Resolved Image and 3D Information Using Multiple Stereo-Pair Images, IEEE Int. Conf. on Image Processing, ICIP 2007, pp. V417-V420.

Bhaysar et al, Resolution Enhancement in Multi-Image Stereo, IEEE Transactions on Pattern Anaylsis and Machine Intelligence, Sep. 2010, pp. 1721-17-1721-28.

\* cited by examiner

GLASSES FOR VIEWING STEREO IMAGES

CROSS REFERENCE TO RELATED APPLICATIONS

Reference is made to commonly assigned U.S. patent application Ser. No. 12/705,647, filed Feb. 15, 2010, entitled "Detection and Display of Stereo Images" by Andrew C. Gallagher; U.S. patent application Ser. No. 12/705,652, filed Feb. 15, 2010, entitled "3-Dimensional Display With Preferences" by Andrew C. Gallagher et al; and U.S. patent application Ser. No. 12/705,659, filed Feb. 15, 2010, entitled "Display With Integrated Camera" by Andrew C. Gallagher et al, the disclosures of which are incorporated herein.

FIELD OF THE INVENTION

The present invention relates to a display system for viewing 2-Dimensional (2D) and 3-Dimensional (3D) images, either with or without viewing glasses.

BACKGROUND OF THE INVENTION

A number of products are available or described for displaying either two dimensional (2D) or three dimensional (3D) images. For viewing 2D images or videos, CRT (cathode ray tube) monitors, LCD (liquid crystal display), OLED (organic light emitting diode) displays, plasma displays, and projection systems are available. In these systems, both human eyes are essentially viewing the same image.

To achieve the impression of 3D, each of the pair of human eyes must view a different image (i.e. captured from a different physical position). The human visual system then merges information from the pair of different images to achieve the impression of depth. The presentation of the pair of different images to each of a pair of human eyes can be accomplished a number of ways, sometimes including special 3D glasses (herein also referred to as multi-view glasses or stereo glasses) for the viewer.

In general, multi-view glasses contain lens materials that prevent the light from one image from entering the eye, but permit the light from the other. For example, the multi-view glasses permit the transmittance of a left eye image through the left lens to the left eye, but inhibit the right eye image. Likewise, the multi-view glasses permit the transmittance of a right eye image through the right lens to the right eye, but inhibit the left eye image. Multi-view glasses include polarized glasses, anaglyph glasses, and shutter glasses.

Anaglyph glasses refer to glasses containing different lens material for each eye, such that the spectral transmittance to light is different for each eye's lens. For example, a common configuration of anaglyph glasses is that the left lens is red (permitting red light to pass while blue light is blocked) and the right lens is blue (permitting blue light to pass while red light is blocked). An anaglyph image is created by first capturing a normal stereo image pair. A typical stereo pair is made by capturing a scene with two horizontally displaced cameras. Then, the anaglyph is constructed by using a portion of the visible light spectrum bandwidth (e.g. the red channel) for the image to be viewed with the left eye, and another portion of the visible light spectrum (e.g. the blue channel) for the image to be viewed with the right eye.

Polarized glasses are commonly used for viewing projected stereo pairs of polarized images. In this case, the projection system or display alternately presents polarized versions of left eye images and right eye images wherein the polarization of the left eye image is orthogonal to the polarization of the right eye image. Viewers are provided with polarized glasses to separate these left eye images and right eye images. For example, the left image of the pair is projected using horizontally polarized light with only horizontal components, and the right image is projected using vertically polarized light with only vertical components. For this example, the left lens of the glasses contains a polarized filter that passes only horizontal components of the light; and the right lens contains a polarized filter that passes only vertical components. This ensures that the left eye will receive only the left image of the stereo pair since the polarized filter will block (i.e. prevent from passing) the right eye image. This technology is employed effectively in a commercial setting in the IMAX system.

One example of this type of display system using linearly polarized light is given in U.S. Pat. No. 7,204,592 (O'Donnell et al.). A stereoscopic display apparatus using left- and right-circular polarization is described in U.S. Pat. No. 7,180,554 (Divelbiss et al.).

Shutter glasses, synchronized with a display, also enable 3D image viewing. In this example, the left and right eye images are alternately presented on the display in a technique which is referred to herein as "page-flip stereo". Synchronously, the lenses of the shutter glasses are alternately changed or shuttered from a transmitting state to a blocking state thereby permitting transmission of an image to an eye followed by blocking of an image to an eye. When the left eye image is displayed, the right glasses lens is in a blocking state to prevent transmission to the right eye, while the left lens is in a transmitting state to permit the left eye to receive the left eye image. Next, the right eye image is displayed with the left glasses lens in a blocking state and the right glasses lens in a transmitting state to permit the right eye to receive the right eye image. In this manner, each eye receives the correct image in turn. Those skilled in the art will note that projection systems and displays which present alternating left and right images (e.g. polarized images or shuttered images) need to be operated at a frame rate that is fast enough that the changes are not noticeable by the user to deliver a pleasing stereoscopic image. As a result, the viewer perceives both the left and right images as continuously presented but with differences in image content related to the different perspectives contained in the left and right images.

Other displays capable of presenting 3D images include displays which use optical techniques to limit the view from the left eye and right eye to only portions of the screen which contain left eye images or right eye images respectively. These types of displays include lenticular displays and barrier displays. In both cases, the left eye image and the right eye image are presented as interlaced columns within the image presented on the display. The lenticule or the barrier act to limit the viewing angle associated with each column of the respective left eye images and right eye images so that the left eye only sees the columns associated with the left eye image and the right eye only sees the columns associated with the right eye image. As such, images presented on a lenticular display or a barrier display are viewable without special glasses. In addition, the lenticular displays and barrier displays are capable of presenting more than just two images (e.g. nine images can be presented) to different portions of the viewing field so that as a viewer moves within the viewing field, different images are seen.

Some projection systems and displays are capable of delivering more than one type of image for 2D and 3D imaging. For example, a display with a slow frame rate (e.g. 30 frames/sec) can present either a 2D image or an anaglyph image for viewing with anaglyph glasses. In contrast, a display with a fast frame rate (e.g. 120 frames/sec) can present either a 2D image, an anaglyph image for viewing with anaglyph glasses or an alternating presentation of left eye images and right eye images which are viewed with synchronized shutter glasses. If the fast display has the capability to present polarized images, then a wide variety of image types can be presented: 2D images, anaglyph images viewed with anaglyph glasses, alternating left eye images and right eye images that viewable with shutter glasses or alternating polarized left eye images and polarized right eye images that are viewable with glasses with orthogonally polarized lenses.

Not all types of images can be presented on all projection systems or displays. In addition, the different types of images require different image processing to create the images from the stereo image pairs as originally captured. Different types of glasses are required for viewing the different types of images as well. A viewer using shutter glasses for viewing an anaglyph image would have an unsatisfactory viewing experience without the impression of 3D. Further complicating the system is that particular viewers have different preferences, tolerances, or abilities for viewing "3D" images or stereo pairs, and these can even be affected by the content itself.

Certain displays are capable of both 2D and 3D modes of display. To make a display capable of 2D or 3D operation, prior art systems require removal of the eyeglasses and manual switching of the display system into a 2D mode of operation. Some prior art systems, such as U.S. Pat. No. 5,463,428 (Lipton et al.) have addressed shutting off active eyeglasses when they are not in use, however, no communications are made to the display, nor is it then switched to a 2D mode. U.S. Pat. No. 7,221,332 (Miller et al.) describes a 3D display switchable to 2D but does not indicate how to automate the switchover. U.S. Patent Application Publication No. 2009/0190095 describes a switchable 2D/3D display system based on eyeglasses using spectral separation techniques, but again does not address automatic switching between modes. In U.S. Ser. No. 12/245,059, there is described a system including a display and glasses where the glasses transmit a signal to the display to switch to 2D mode when the glasses are removed from the face.

Viewing preferences are addressed by some viewing systems. For example, in U.S. Ser. No. 12/212,852, the viewing population is divided into viewing subsets based on the ability to fuse stereo images at particular horizontal disparities and the stereo presentation for each subset is presented in an optimized fashion for each subset. In U.S. Pat. No. 7,369,100, multiple people in a viewing region are found, and viewing privileges for each person determine the content that is shown. For example, when a child is present in the room, only a "G" rated movie is shown. In U.S. Patent Application Publication No. 2007/0013624, a display is described for showing different content to various people in the viewing region. For example, a driver can see a speedometer, but the child in the passenger seat views a cartoon.

SUMMARY OF THE INVENTION

In accordance with the present invention there is provided, spectacles for use in viewing images or videos, comprising:

(a) at least two lenses each having an adjustable optical property;

(b) an image capture device associated with the spectacles for receiving a digital image comprising a plurality of digital image channels each containing multiple pixels;

(c) the image capture device capturing a digital image;

(d) a processor for computing a feature vector from pixel values of the digital image channels wherein the feature vector includes information that would indicate whether the image is an anaglyph or a non-anaglyph image;

(e) the processor producing an anaglyph classification by analyzing the digital image to classify the digital image as either an anaglyph or as a non-anaglyph based on the feature vector; and (f) the processor controlling an optical property of at least one of the two lenses based on the anaglyph classification.

Features and advantages of the present invention include glasses having at least two lenses with adjustable density and an image capture device. The image capture device captures scene images and determined whether that scene contains 3D images such as anaglyph images. Then, the processor adjusts the density of the lenses of the glasses to enable the viewer to view the image with the perception of depth. Further, the density of the lenses corresponding to lens locations not associated with 3D images is left unaffected, permitting the wearer to perceive these portions of viewing space in a normal manner. This invention permits the wearer to look at content and trust that the glasses will adjust themselves according to the content, rather than having to carry multiple 3D viewing glasses and determine by trial and error which pair of glasses are appropriate for a particular image display.

DETAILED DESCRIPTION OF THE INVENTION

The present invention will be directed in particular to elements forming part of, or in cooperation more directly with the apparatus in accordance with the present invention. It is to be understood that elements not specifically shown or described can take various forms well known to those skilled in the art.

Figure 1:
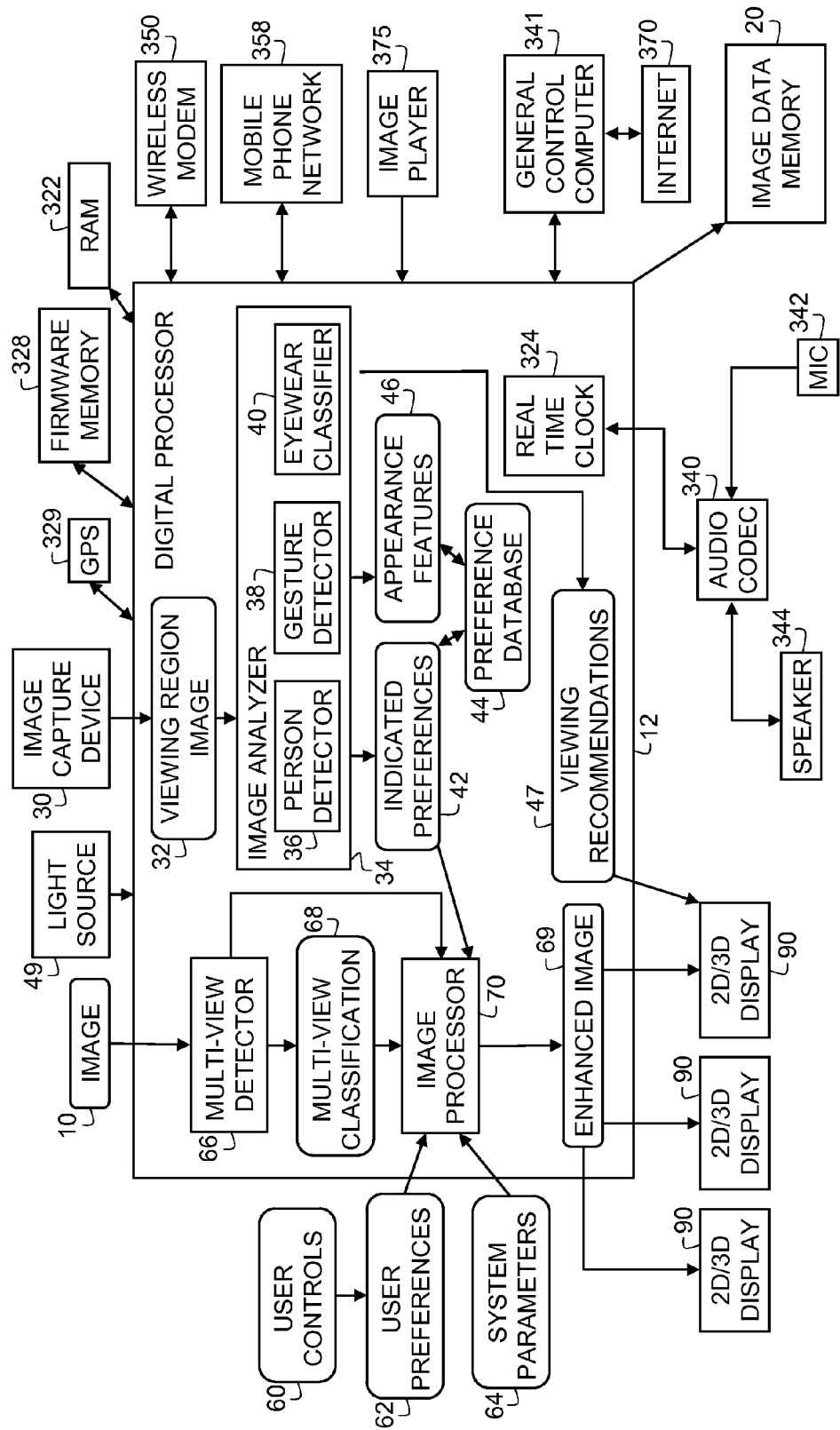
FIG. 1 is pictorial of a display system that can make use of the present invention.

FIG. 1 is a block diagram of a 2D and 3D or multi-view image display system that can be used to implement the present invention. A multi-view display is a display that can present multiple different images to different viewers or different viewing regions such that the viewers perceive the images as presented simultaneously. The present invention can also be implemented for use with any type of digital imaging device, such as a digital still camera, camera phone, personal computer, or digital video cameras, or with any system that receives digital images. As such, the invention includes methods and apparatus for both still images and videos. The images presented by a multi-view display can be 2D images, 3D images or images with more dimensions.

The image display system of FIG. 1 is capable of displaying a digital image 10 in a preferred manner. For convenience of reference, it should be understood that the image 10 refers to both still images and videos or collections of images.

Further, the image 10 can be an image that is captured with a camera or image capture device 30, or the image 10 can be an image generated on a computer or by an artist. Further, the image 10 can be a single-view image (i.e. a 2D image) including a single perspective image of a scene at a time, or the image 10 can be a set of images (a 3D image or a multi-view image) including two or more perspective images of a scene that are captured and rendered as a set. When the number of perspective images of a scene is two, the images are a stereo pair. Further, the image 10 can be a 2D or 3D video, i.e. a time series of 2D or 3D images. The image 10 can also have an associated audio signal.

In one embodiment, the display system of FIG. 1 captures viewing region images from which people can view the images, and then determines preferred method for display of the image 10. A viewing region image 32 is an image of the area that the display is viewable from included in the viewing region image 32 are images of person(s) who are viewing the one or more 2D/3D displays 90. To enable capture of viewing region images 32, the display system has an associated image capture device 30 for capturing images of the viewing image region 32. The viewing region image 32 contains images of the person(s) who are viewing the one or more 2D/3D displays 90. The 2D/3D displays 90 include monitors such as LCD, CRT, OLED or plasma monitors, and monitors that project images onto a screen. The viewing region image 32 is analyzed by an image analyzer 34 to determine indications of preference for the preferred display settings of images 10 on the display system. The sensor array of the image capture device 30 can have, for example, 1280 columns×960 rows of pixels.

In some embodiments, the image capture device 30 can also capture and store video clips. The digital data is stored in a RAM buffer memory 322 and subsequently processed by a digital processor 12 controlled by the firmware stored in firmware memory 328, which can be flash EPROM memory. The digital processor 12 includes a real-time clock 324, which keeps the date and time even when the display system and digital processor 12 are in their low power state.

The digital processor 12 operates on or provides various image sizes selected by the user or by the display system. Images are typically stored as rendered sRGB image data is then JPEG compressed and stored as a JPEG image file in the image/data memory 20. The JPEG image file will typically use the well-known EXIF (EXchangable Image File Format) image format. This format includes an EXIF application segment that stores particular image metadata using various TIFF tags. Separate TIFF tags can be used, for example, to store the date and time the picture was captured, the lens F/# and other camera settings for the image capture device 30, and to store image captions. In particular, the ImageDescription tag can be used to store labels. The real-time clock 324 provides a capture date/time value, which is stored as date/time metadata in each Exif image file. Videos are typically compressed with H.264 and encoded as MPEG4.

In some embodiments, the geographic location stored with an image captured by the image capture device 30 by using, for example a GPS unit 329. Other methods for determining location can use any of a number of methods for determining the location of the image. For example, the geographic location can be determined from the location of nearby cell phone towers or by receiving communications from the well-known Global Positioning Satellites (GPS). The location is preferably stored in units of latitude and longitude. Geographic location from the GPS unit 329 is used in some embodiments to regional preferences or behaviors of the display system.

The graphical user interface displayed on the 2D/3D display 90 is controlled by user controls 60. The user controls 60 can include dedicated push buttons (e.g. a telephone keypad) to dial a phone number, a control to set the mode, a joystick controller that includes 4-way control (up, down, left, and right) and a push-button center "OK" switch, or the like.

The display system can in some embodiments access a wireless modem 350 and the interne 370 to access images for display. The display system is controlled with a general control computer 341. In some embodiments, the display system accesses a mobile phone network for permitting human communication via the display system, or for permitting control signals to travel to or from the display system. An audio codec 340 connected to the digital processor 12 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from a mobile phone network 358 and stored in the memory 322. In addition, a vibration device (not shown) can be used to provide a silent (e.g. non audible) notification of an incoming phone call.

The interface between the display system and the general purpose computer 341 can be a wireless interface, such as the well-known Bluetooth wireless interface or the well-known 802.11b wireless interface. The image 10 can be received by the display system via an image player 375 such as a DVD player, a network, with a wired or wireless connection, via the mobile phone network 358, or via the internet 370. It should also be noted that the present invention can be implemented in a combination of software and hardware and is not limited to devices that are physically connected or located within the same physical location. The digital processor 12 is coupled to a wireless modem 350, which enables the display system to transmit and receive information via an RF channel. The wireless modem 350 communicates over a radio frequency (e.g. wireless) link with the mobile phone network 358, such as a 3GSM network. The mobile phone network 358 can communicate with a photo service provider, which can store images. These images can be accessed via the Internet 370 by other devices, including the general purpose computer 341. The mobile phone network 358 also connects to a standard telephone network (not shown) in order to provide normal telephone service.

Figure 8:
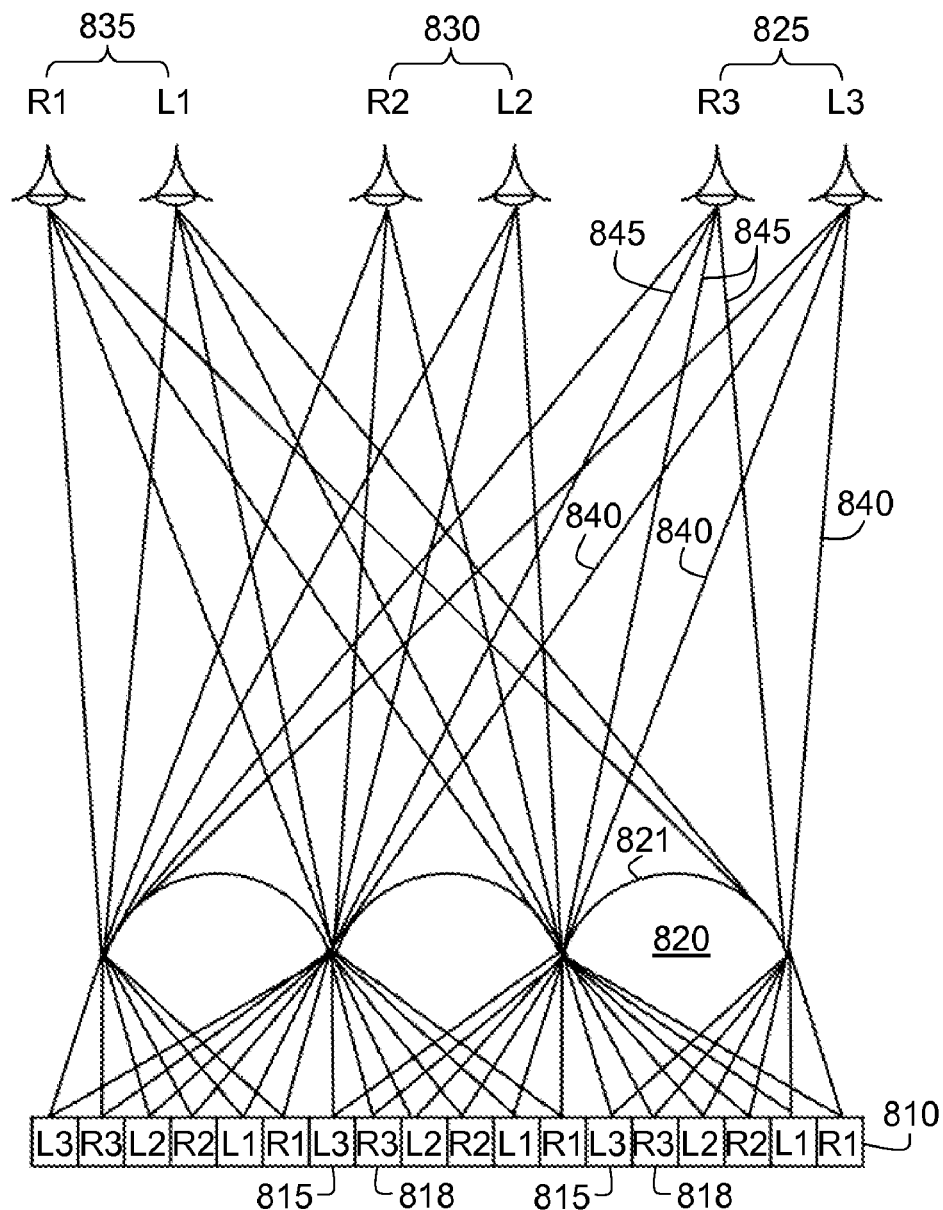
FIG. 8 is a schematic diagram of a lenticular display and the various viewing zones.
Figure 9:
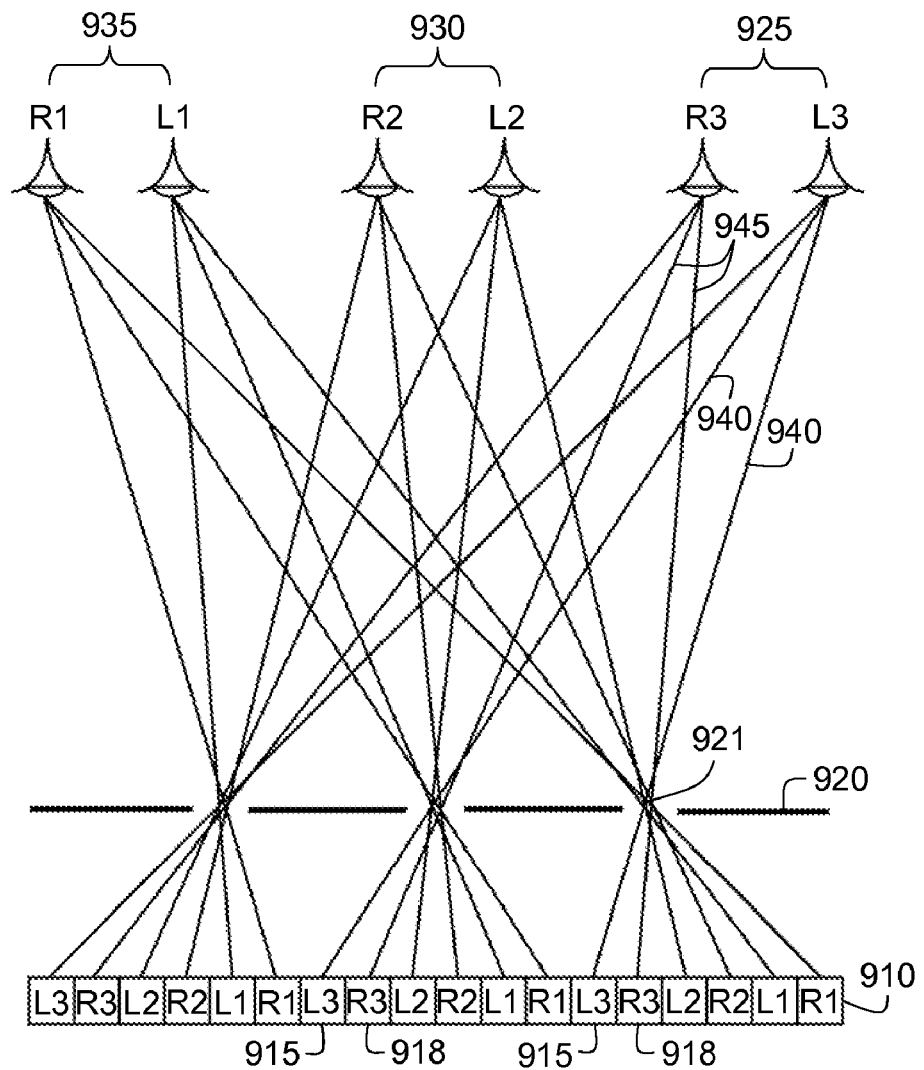
FIG. 9 is a schematic diagram of a barrier display and the various viewing zones.

FIGS. 8 and 9 show schematic diagrams for two types of displays that can present different images simultaneously to different viewing regions within the viewing field of the display. FIG. 8 shows a schematic diagram of a lenticular display along with the various viewing regions. In this case, the display 810 includes a lenticular lens array 820 including a series of cylindrical lenses 821. The cylindrical lenses 821 cause the viewer to see different vertical portions of the display 810 when viewed from different viewing regions as shown by the eye pairs 825, 830 and 835. In a lenticular display, the different images to be presented simultaneously are each divided into a series of columns. The series of columns from each of the different images to be presented simultaneously are then interleaved with each other to form a single interleaved image and the interleaved image is presented on the display. The cylindrical lenses 821 are located such that only columns from one of the different images are viewable from any one position in the viewing field. Light rays 840 and 845 illustrate the field of view for each cylindrical lens 821 for the eye pair L3 and R3 825 where the field of view for each cylindrical lens 820 is shown focused onto pixels 815 and 818 respectively. The left eye view L3 is focused to left eye image pixels 815 which are labeled in FIG. 8 as a series of L3 pixels on the display 810. Similarly the right eye view R3 is focused onto the right eye image pixels 818 which are labeled in FIG. 8 as a series of pixels R3 on the display 810. In this way, the image seen at a particular location in the viewing field is of one of the different images including a series of columns of the one different image that are presented by a respective series of cylindrical lenses 820 and the interleaved columns from the other different images contained in the interleaved image are not visible. In this way, multiple images can be presented simultaneously to different locations in the viewing field by a lenticular display. The multiple images can be presented to multiple viewers in different locations in the viewing field or a single user can move between locations in the viewing field to view the multiple images one at a time. The number of different images that can be presented simultaneously to different locations in the viewing field of a lenticular display can vary from 1-25 dependent only on the relative sizing of the pixels on the display compared to the pitch of the cylindrical lenses and the desired resolution in each image. For the example shown, 6 pixels are located under each cylindrical lens, however, many more pixels can be located under each cylindrical lens. In addition, while the columns of each image presented in FIG. 8 under each cylindrical lens are shown as a single pixel wide, in many cases, the columns of each image presented under each cylindrical lens can be multiple pixels wide.

FIG. 9 shows a schematic diagram of a barrier display with the various viewing regions. A barrier display is similar to a lenticular display in that multiple different images can be presented simultaneously to different viewing regions within the viewing field of the display. The difference between a lenticular display and a barrier display is that the lenticular lens array 820 is replaced by a barrier 920 with vertical slots 921 that is used to limit the view of the display from different locations in the viewing field to columns of pixels on the display 910. FIG. 9 shows the views for eye pairs 925, 930 and 935. Light rays 940 and 945 illustrate the view through each vertical slot 921 in the barrier 920 for the eye pair 925 onto pixels 915 and 918 respectively. The left eye view L3 can only see left eye image pixels 915 which are shown in FIG. 9 as the series of L3 pixels on the display 910. Similarly the right eye view R3 can only see the right eye image pixels 918 which are shown as a series of pixels R3 on the display 910. In this way, the image seen at a particular region in the viewing field is of only one of the different images including a series of columns of the one image and the interleaved columns from the other different images contained in the interleaved image are not visible. In this way, multiple images can be presented simultaneously to different locations in the viewing field by a barrier display. Like the lenticular display, the number of images presented simultaneously by a barrier display can vary and the columns for each image as seen through the vertical slots 921 can be more than one pixel wide.

The display system contains at least one 2D/3D display 90 for displaying an image 10. As described hereinabove, the image 10 can be a 2D image, a 3D image, or a video version of any of the aforementioned. The image 10 can also have associated audio. The display system has one or more displays 90 that are each capable of displaying a 2D or a 3D image, or both. For the purposes of this disclosure, a 3D display is one that is capable of displaying two or more images to two or more different regions in the viewing area (or viewing field) of the display. There are no constraints on what the two different images are (e.g. one image can be a cartoon video, and the other can be a 2D still image of the Grand Canyon). When the two different images are images of a scene captured from different perspectives, and the left and the right eye of an observer each see one of the images, then the observer's visual system fuses these two images captured from different perspectives through the process of binocular fusion and achieves the impression of depth or "3D". If the left and right eye of an observer, both see the same image (without a perspective difference) then the observer does not get an impression of depth and a 2D image is seen. In this way, a multi-view display can be used to present 2D or 3D images. It is also an aspect of the present invention that one viewer can be presented a stereo image, while another viewer also viewing the display at the same time can be presented a 2D image. Each of the two or more viewers see two different images (one with each eye) from a collection of images that are displayed (for example, the six different images that can be shown with the 3D display of FIG. 8). The first viewer is shown for example, images 1 and 2 (i.e. 2 images from a stereo pair) and perceives the stereo pair in 3D, and the second viewer is shown images 1 and 1 (i.e. the same two images) and perceives 2D.

As described in the background, there are many different systems (including display hardware and various wearable eyeglasses) that are components of 3D display systems. While some previous works describe systems where the display and any viewing glasses actively communicate to achieve preferred viewing parameters (e.g. U.S. Pat. No. 5,463,428), this communication is limiting for some applications. In the preferred embodiment of this invention, the display system considers characteristics of the image 10, parameters of the system 64, user preferences 62 that have been provided via user controls 60 such as a graphical user interface or a remote control device (not shown) as well as an analysis of images of the viewing region image 32 in order to determine the preferred parameters for displaying the image 10. In some embodiments, before displaying the image 10, the image 10 is modified by an image processor 70 response to parameters based on the system parameters 64, user preferences 62, and indicated preferences 42 from an analysis of the viewing region image 32, as well as the multi-view classification 68.

The image 10 can be either an image or a video (i.e. a collection of images across time). A digital image includes one or more digital image channels. Each digital image channel includes a two-dimensional array of pixels. Each pixel value relates to the amount of light received by the imaging capture device corresponding to the geometrical domain of the pixel. For color imaging applications, a digital image will typically includes red, green, and blue digital image channels. Other configurations are also practiced, e.g. cyan, magenta, and yellow digital image channels or red, green, blue and white. For monochrome applications, the digital image includes one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two-dimensional array of pixels values arranged by rows and columns, those skilled in the art will recognize that the present invention can be applied to mosaic (non-rectilinear) arrays with equal effect.

Typically, the image 10 arrives in a standard filetype such as JPEG or TIFF. However, simply because an image arrives in a single file does not mean that the image is merely a 2D image. There are several file formats and algorithms for combining information from multiple images (such as two or more images for a 3D image) into a single file. For example, the Fuji Real3D camera simultaneously captures two images from two different lenses offset by 77 mm and packages both images into a single file with the extension .MPO. The file format is readable by an EXIF file reader, with the information from the left camera image in the image area of the EXIF file, and the information from the right camera image in a tag area of the EXIF file.

In another example, the pixel values from a set of multiple views of a scene can be interlaced to form an image. For example, when preparing an image for the Synthagram monitor (StereoGraphics Corporation, San Rafael, Calif.), pixel values from up to nine images of the same scene from different perspectives are interlaced to prepare an image for display on that lenticular monitor. The art of the SynthaGram® display is covered in U.S. Pat. No. 6,519,088 entitled "Method and Apparatus for Maximizing the Viewing Zone of a Lenticular Stereogram," and U.S. Pat. No. 6,366,281 entitled "Synthetic Panoramagram." The art of the SynthaGram® display is also covered in U.S. Publication No. 2002/0036825 entitled "Autostereoscopic Screen with Greater Clarity," and U.S. Publication No. 2002/0011969 entitled "Autostereoscopic Pixel Arrangement Techniques."

Another common example where a single file contains information from multiple views of the same scene is an anaglyph image. An anaglyph image is created by setting the one color channel of the anaglyph image (usually the red channel) equal to an image channel (usually red) of the left image stereo pair. The blue and green channels of the anaglyph image are created by setting them equal to channels (usually the green and blue, respectively) from of the right image stereo pair. The anaglyph image is then viewable with standard anaglyph glasses (red filer on left eye, blue on right) to ensure each eye receives different views of the scene.

Another multi-view format, described by Philips 3D Solutions in the document "3D Content Creation Guidelines," downloaded from http://www.inition co.uk/inition/pdf/stereovis_philips_content.pdf is a two dimensional image plus an additional channel having the same number of pixel locations, wherein the value of each pixel indicates the depth (i.e. near or far or in between) of the object at that position (called Z).

Certain decisions about the preferred display of the image 10 in the display system are based on whether the image 10 is a single-view image or a multi-view image (i.e. a 2D or 3D image). The multi-view detector 66 examines the image 10 to determine whether the image 10 is a 2D image or a 3D image and produces a multi-view classification 68 that indicates whether the image is a 2D image or a 3D image and the type of 3D image that it is (e.g. an anaglyph).

Multi-View Detector 66

The multi-view detector 66 examines the image 10 by determining whether the image is statistically more like a single-view image, or more like a multi-view image (i.e. a 2D or 3D image). Each of these two categories can have further subdivisions such as a multi-view image that is an anaglyph, a multi-view image that is a combination of multiple images, an RGB signal-view 2D image, or a grayscale single-view 2D image.

Figure 2:
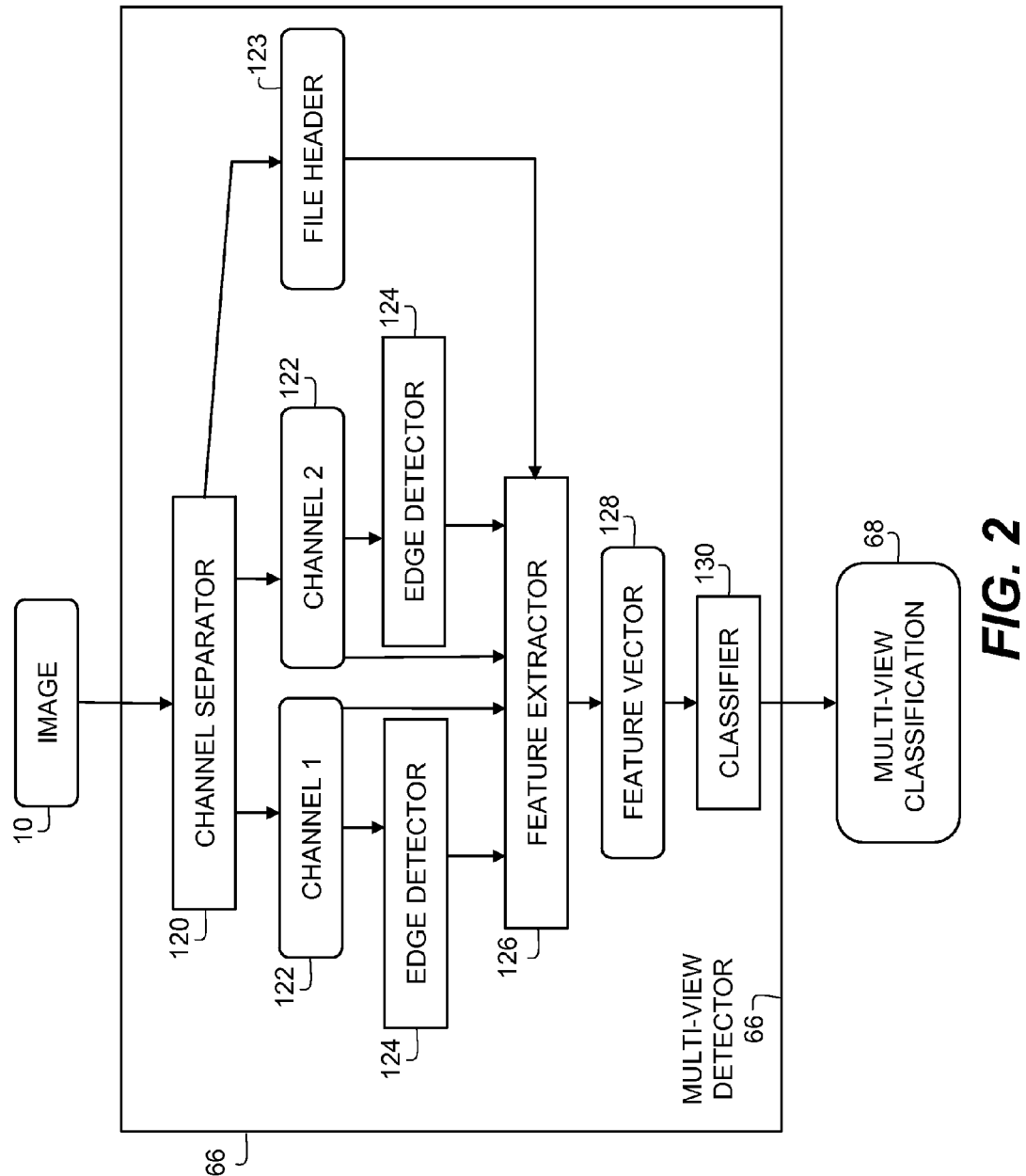
FIG. 2 is a flowchart of the multi-view classifier.

FIG. 2 shows a more detailed view of the multi-view detector 66 that is an embodiment of the invention. For this description, the multi-view detector 66 is tuned for distinguishing between anaglyph images and non-anaglyph images. However, with appropriate adjustment of the components of the multi-view detector, other types of multiple view images (e.g. the synthaGram "interzigged" or interlaced image as described above) can be detected as well. A channel separator 120 separates the input image into its component channels 122 (two are shown, but the image 10 often has three or more channels), and also reads information from the file header 123. In some cases, the file header 123 itself contains a tag indicating the multi-view classification of the image, but often this is not the case and an analysis of the information from pixel values is useful. Note that the analysis can be carried out on a downsampled (reduced) version of the image (not shown) in some cases to reduce the computational intensity required.

The channels 122 are operated upon by edge detectors 124. Preferably, the edge detector 124 determines the magnitude of the edge gradient at each pixel location in the image by convolving with horizontal and vertical Prewitt operators. The edge gradient is the square root of the sum of the squares of the horizontal and vertical edge gradients, as computed with the Prewitt operator. Other edge detectors 124 can also be used (e.g. the Canny edge detector, or the Sobel edge operator), and these edge operations are well-known to practitioners skilled in the art of image processing.

The channels 122 and the edge gradients from the edge detectors 124 are input to a feature extractor 126 for the purpose of producing a feature vector 128 that is a compact representation of the image 10 that contains information relevant to the decision of whether or not the image 10 is a 3D (multi-view) image or a 2D (single-view) image. In the preferred embodiment, the feature vector 128 contains numerical information computed as follows:

(a) CCrg: the correlation coefficient between the pixel values of a first channel 122 and a second channel 122 from the image 10.

(b) CCrb: the correlation coefficient between the pixel values of a first channel 122 and a third channel 122 from the image 10.

(c) CCgb: the correlation coefficient between the pixel values of a second channel 122 and a second channel 122 from the image 10. When the image 10 is an anaglyph, the value CCrg is generally lower (because the first channel image corresponds the left camera image red channel and the second channel image corresponds to the green channel of the right camera image) than when the image 10 is a non-anaglyph. Note that the correlations are effectively found over a defined pixel neighborhood (in this case, the neighborhood is the entire image), but the defined neighborhood can be smaller (e.g. only the center ⅓ of the image).

(d) a chrominance histogram of the image. This is created by rotating each pixel into a chrominance space (assuming a three channel image corresponding to red, green, and blue) as follows:

Let the variables $R_{ij}$, $G_{ij}$, and $B_{ij}$ refer to the pixel values corresponding to the first, second, and third digital image channels located at the $i^{th}$ row and $j^{th}$ column. Let the variables $L_{ij}$, $GM_{ij}$, and $ILL_{ij}$ refer to the transformed luminance, first chrominance, and second chrominance pixel values respectively of an LCC representation digital image. The 3 by 3 elements of the matrix transformation are described by (1).

$$L_{ij} = 0.333 R_{ij} + 0.333 G_{ij} + 0.333 B_{ij}$$

$$GM_{ij} = -0.25 R_{ij} + 0.50 G_{ij} - 0.25 B_{ij}$$

$$ILL_{ij} = -0.50 R_{ij} + 0.50 B_{ij} \quad (1)$$

Then, by quantizing the values of GM and ILL, a two dimensional histogram is formed (preferably 13×13 bins, or 169 bins in total). This chrominance histogram is an effective feature for distinguishing between a 2D single-view three color image and an anaglyph (a 3D multi-view three color image) because anaglyph images tend to have a greater number of pixels with a red or cyan/blue hue than a typical 2D single-view three color image would.

(e) Edge alignment features: The feature extractor 126 computes measures of coincident edges between the channels of the digital image 10. These measures are called coincidence factors. For a single-view three color image, the edges found in one channel tend to coincide in position with the edges in another channel because edges tend to occur at object boundaries. However, in anaglyph images, because the channels originate from disparate perspectives of the same scene, the edges from one channel are less likely to coincide with the edges from another. Therefore, measuring the edge overlap between the edges from multiple channels provides information relevant to the decision of whether an image is and anaglyph (a multi-view image) or a nonanaglyph. For purposes of these features, two channels are selected and the edges for each are found as those pixels with a gradient magnitude (found by the edge detector 124) greater than the remaining T % (preferably, T=90) of the other pixels from the channel 122. In addition, edge pixels must also have a greater gradient magnitude than any neighbor in a local neighborhood (preferably a 3×3 pixel neighborhood). Then, considering a pair of channels, the feature values are found as: the number of locations that are edge pixels in both channels, the number of locations that are edge pixels in at least one channel, and the ratio of the two numbers. Note that in producing this feature, a pixel neighborhood is defined and differences between pixel values in the neighborhood are found (by applying the edge detector with preferably a Prewitt operator that finds a sum of weighted pixel values with weight coefficients of 1 and −1). The feature value is then produced responsive to these calculated differences.

(f) stereo alignment features: A stereo alignment algorithm is applied to a pair of channels 122. In general, when the two channels 122 are from a single-view image and correspond only to two different colors, the alignment between a patch of pixels from one channel 122 with the second channel 122 is often best without shifting or offsetting the patch with respect to the second channel 122. However, when the two channels 122 are each from different view of a multi-view image (as is the case with an anaglyph image), then the best local alignments between a patch of pixels from one channel 122 with the second image channel is often a non-zero offset. Any stereo alignment algorithm can be used. Stereo matching algorithms are described in D. Scharstein and R. Szeliski. A taxonomy and evaluation of dense two-frame stereo correspondence algorithms. International Journal of Computer Vision, 47(1/2/3):7-42, April-June 2002. Note that all stereo alignment algorithms require a measure of the quality of a local alignment, also referred to as "matching cost", (i.e. an indication of the quality of the alignment of a patch of pixel values from the first channel 122 at a particular offset with respect to the second image channel). Typically, a measure of pixel value difference (e.g. mean absolute difference, mean square difference) is used as the quality measure. However, because the channels often represent different colors, a preferred quality measure is the correlation between the channels rather than pixel value differences (as a particular region, even perfectly aligned can a large difference between color channels (e.g. the sky)). Alternatively, the quality measure can be pixel value difference when the stereo alignment algorithm is applied to gradient channels produced by the edge detector 124 as in the preferred embodiment. The stereo alignment algorithm determines the offset for each pixel of one channel 122 such that it matches with the second channel.

Assuming that if the image 10 is a stereo image captured with horizontally displaced cameras, the stereo alignment need only search for matches along the horizontal direction. The number of pixels with a non-zero displacement is used as a feature, as is the average and the median displacement at all pixel locations.

The feature vector 128, which now represents the image 10, is passed to a classifier 130 for classifying the image 10 as either a single-view image or as an anaglyph image, thereby producing a multi-view classification 68. The classifier 130 is produced using either a training procedure of learning the statistical relationship between an image from a training set, and a known indication of whether the image is a 2D single-view image or a 3D multi-view image. The classifier 130 can also be created with "expert knowledge" which means that an operator can adjust values in a formula until the system performance is good. Many different types of classifiers can be used, including Gaussian Maximum Likelihood, logistic regression, Adaboost, Support Vector Machine, and Bayes Network. As a testament to the feasibility to this approach, an experiment was conducted using the aforementioned feature vector 128. In the experiment, the multi-view classification 68 was correct (for the classes of non-anaglyph and anaglyph) over 95% when tested with a large set (1000 from each of the two categories) of anaglyphs and non-anaglyphs in equal number that are downloaded from the Internet.

When the image 10 is a video sequence, a selection of frames from the video are analyzed. The classifier 130 produces a multi-view classification 68 for each selected frame, and these classifications are consolidated over a time window using standard techniques (e.g. majority vote over a specific time window segment (e.g. 1 second)) to produce a final classification for the segment of the video. Thus, one portion (segment) of a video can be classified as an anaglyph, and another portion (segment) can be a single view image.

Analyzing the Viewing Region Image

The display system has at least one associated image capture device 30. Preferably, the display system contains one or more image capture devices 30 integral with the displays (e.g. embedded into the frame of the display). In the preferred embodiment, the image capture device 30 captures viewing region images 32 (preferably real-time video) of a viewing region. The display system uses information from an analysis of the viewing region image 32 in order to determine display settings or recommendations. The analysis of the viewing region images 32 can determine information that is useful for presenting different images to viewing regions including: which viewing regions contain people, what type of eyewear the people are wearing, who the people are, and what types of gestures the people are making at a particular time. Based on the eyewear of the viewers found with a person detector 36, viewing recommendations 47 can be presented to the viewers by the display system. The terms "eyewear", "glasses," and "spectacles" are used synonymously in this disclosure. Similarly, the determined eyewear can implicitly indicate preferences 42 of the viewers for viewing the image 10 so that the image 10 can be processed by the image processor 70 to produce the preferred image type for displaying on a display. Further, when the display system contains multiple 2D/3D displays 90, the specific set of displays that are selected for displaying an enhanced image 69 are selected responsive to the indicated preferences 42 from the determined eyewear of the users from the eyewear classifier 40. Further, one or more viewers can indicate preferences via gestures that are detected with a gesture detector 38. Note that different viewers can indicate different preferences 42. Some displays can accommodate different indicated preferences 42 for different people in the viewing region image 32. For example, a lenticular 3D display such as described by U.S. Pat. No. 6,519,088 can display up to nine different images that can be observed at different regions in the viewing space.

The image analyzer 34 contains the person detector 36 for locating the viewers of the content shown on the displays of the display system. The person detector 36 can be any detector known in the art. Preferably, a face detector is used as the person detector 36 to find people in the viewing region image 32. A commonly used face detectors is described by P. Viola and M. Jones, "Robust Real-time Object Detection," IJCV, 2001.

Gesture Detector

The gesture detector 38 detects the gestures of the detected people in order to determine viewing preferences. Viewing preferences for viewing 2D and 3D content are important because different people have different tolerances to the presentation of 3D images. In some cases, a person may have difficulty viewing 3D images. The difficulty can be simply in fusing the two or more images presented in the 3D image (gaining the impression of depth), or in some cases, the person can have visual discomfort, eyestrain, nausea, or headache. Even for people that enjoy viewing 3D images, the mental processing of the two or more images can drastically affect the experience. For example, depending on the distance between the cameras used to capture the two or more images with different perspectives of a scene that includes a 3D image, the impression of depth can be greater or less. Further, the images in a 3D image are generally presented in an overlapped fashion on a display. However, in some cases, by performing a registration between the images from the distinct perspectives, the viewing discomfort is reduced. This effect is described by I. Ideses and L Yaroslaysky, "Three methods that improve the visual quality of colour anaglyphs", Journal of Optics A: Pure Applied Optics, 2005, pp 755-762.

The gesture detector 38 can also detect hand gestures. Detecting hand gestures is accomplished using methods known in the art. For example, Pavlovic, V., Sharma, R. & Huang, T. (1997), "Visual interpretation of hand gestures for human-computer interaction: A review", IEEE Trans. Pattern Analysis and Machine Intelligence., July, 1997. Vol. 19(7), pp. 677-695 describe methods for detecting hand gestures. For example, if a viewer prefers a 2D viewing experience, then the viewer holds up a hand with two fingers raised to indicate his or her indicated preference 42. Likewise, if the viewer prefers a 3D viewing experience, then the viewer holds up a hand with three fingers extended. The gesture detector 38 then detects the gesture (in the preferred case by the number of extended fingers) and produces the indicated preferences 42 for the viewing region associated with the gesture for that viewer.

The gesture detector 38 can also detect gestures for switching the viewing experience. For example, by holding up a fist, the display system can switch to 2D view if it was in 3D mode, and into 3D mode if it was in 2D mode. Note that 2D mode can be achieved in several manners. For example, in multi-view display where each of the viewer's eyes see two different images (i.e. sets of pixels), the viewing mode can be switched to 2D merely by displaying the same image to both eyes. Alternatively, the 2D mode can be achieved by turning off the barrier in a barrier display, or by negating the effects of a set of lenslets by modifying the refractive index of a liquid crystal in a display. Likewise, the gesture detector 38 interprets gestures that indicate "more" or "less" depth effect by detecting for example a single finger pointed up or down (respectively). Responsive to this indicated preference 42, the image processor 70 processes the images of a stereo pair to either reduce or increase the perception of depth by either increasing or reducing the horizontal disparity between objects of the stereo pair of images. This is accomplished by shifting one image of a stereo pair relative to the other, or by selecting as the stereo pair for presentation a pair of images that were captured with either a closer or a further distance between the capture devices (baseline). In the extreme, by reducing the 3D viewing experience many times, the distance between the two image capture devices becomes nil and the two images of the stereo pair are identical, and therefore the viewer perceives only a 2D image (since each eye sees the same image).

In some embodiments, the viewer can also indicate which eye is dominant with a gesture (e.g. by pointing to his or her dominant eye, or by closing his or her less dominant eye). By knowing which eye is dominant, the image processor 70 can ensure that that eye's image has improved sharpness or color characteristics versus the image presented to the other eye.

In an alternate embodiment of the invention, where the viewer doesn't know his or her preferences, the digital processor 12 presents a series of different versions of the same image to the viewer, in which the different versions of the image have been processed with different assumed preferences. The viewer then indicates which of the versions of the image have better perceived characteristics and the digital processor translates the choices of the viewer into preferences which can then be stored for the viewer in the preference database 44. The series of different versions of the same image can be presented in a series of image pairs with different assumed preferences, where the viewer indicates which of the different versions of the image in each image pair are perceived as having better characteristics within the image pair. Alternately, a series of different version of the images can be presented with different combinations of assumed preferences and the viewer can indicate which version from the series has the preferred perceived overall characteristics.

In addition, the person analyzer 36 computes appearance features 46 for each person in the viewing region image 32 and stores the appearance features 46, along with the associated indicated preferences 42 for that person in the preference database 44. Then, at a future time, the display system can recognize a person in the viewing region image 32 and recover that person's individual indicated preferences 42. Recognizing people based on their appearance is well known to one skilled in the art. Appearance features 46 can be facial features using an Active Shape Model (T. Cootes, C. Taylor, D. Cooper, and J. Graham. Active shape models-their training and application. CVIU, 1995.) Alternatively, appearance features 46 for recognizing people are preferably Fisher faces. Each face is normalized in scale (49×61 pixels) and projected onto a set of Fisherfaces (as described by P. N. Belhumeur, J. Hespanha, and D. J. Kriegman. Eigenfaces vs. fisherfaces: Recognition using class specific linear projection. PAMI, 1997) and classifiers (e.g. nearest neighbor with a distance measure of mean square difference) are used to determine the identity of a person in the viewing region image 32. When the viewer is effectively recognized, effort is conserved because the viewer does not need to use gestures to indicate his or her preference; instead his or her preference is recovered from the preference database 44.

In some cases, a viewer implicitly indicates his or her preferences 42 by the eyewear that he or she either chooses to wear or not to wear. For example, when the viewer has on anaglyph glasses that are detected by the eyewear classifier 40, this indicates a preference for viewing an anaglyph image 10. Further, if the viewer wears shutter glasses, this indicates that the viewer prefers to view page-flip stereo, where images intended for the left and right eye are alternately displayed onto a screen. Further, it the viewer wears no glasses at all, or only prescription glasses, then the viewer can be showing a preference to view either a 2D image, or to view a 3D image on a 3D lenticular display where no viewing glasses are necessary.

Eyewear Classifier

The eyewear classifier 40 determines the type of eyewear that a person is wearing. Among the possible types of detected eyewear are: (none, corrective lens glasses, sunglasses, anaglyph glasses, polarized glasses, pulfrich glasses (where one lens is darker than the other, or shutter glasses)). In some embodiments, a viewer's eyewear can signal to the eyewear classifier 40 via a signal transmission such as infrared or wireless communication via 802.11 protocol or with RFID.

Figure 3:
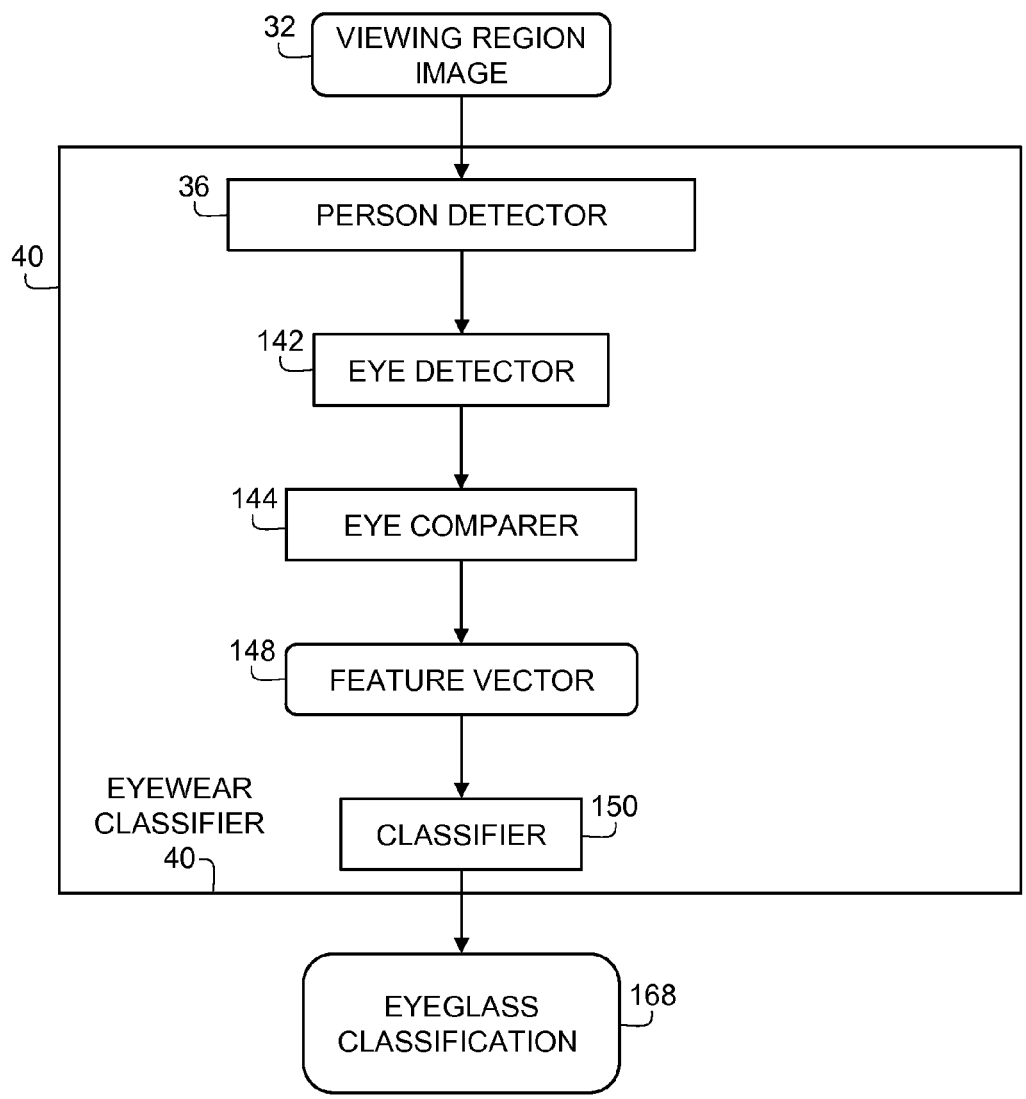
FIG. 3 is a flowchart of the eyewear classifier.

The preferred embodiment of the eyewear classifier 40 is described in FIG. 3. The viewing region image 32 is passed to the person detector 36 for finding people. Next, an eye detector 142 is used for locating the two eye regions for the person. Many eye detectors have been described in the art of computer vision. The preferred eye detector 142 is based on an active shape model (see T. Cootes, C. Taylor, D. Cooper, and J. Graham. Active shape models-their training and application. CVIU, 1995) which is capable of locating eyes on faces. Other eye detectors 142 such as that described in U.S. Pat. No. 5,293,427 can be used. Alternatively, an eyeglasses detector, such as the one described in U.S. Pat. No. 7,370,970 can be used. The eyeglass detector 142 detects the two lenses of the glasses, one corresponding to each eye.

An eye comparer 144 uses the pixel values from the eye regions to produce a feature vector 148 useful for distinguishing between the different types of eyewear. Individual values of the feature vector 148 are computed as follows: the mean value of each eye region, the difference (or ratio) in code value of the mean value for each color channel of the eye region. When either no glasses, sunglasses, or corrective lens glasses are worn, the difference between the mean value for each color channel is small. However, when anaglyph glasses (typically red-blur or red-cyan) are worn, the eye regions of people in the viewing region image 32 appear to have a different color. Likewise, when pulfrich glasses are worn, the eye regions in the viewing region image 32 appear to be of vastly different lightnesses.

Note that viewing region images 32 can be captured using illumination provided by a light source 49 of FIG. 1, and multiple image captures can be analyzed by the eyewear classifier 40. To detect polarized glasses, the light source 49 first emits light at a certain (e.g. horizontal) polarization and captures a first viewing region image 32 and then repeats the process capturing a second viewing region image 32 while the light source 49 emits light at a different (preferably orthogonal) polarization. Then, the eye comparer 144 generates the feature vector 148 by comparing pixel values from the eye regions in the two viewing region images (this provides four pixel values, two from each of the viewing region images 32). By computing the differences in pairs between the mean values of eye regions, polarized glasses can be detected. The lenses of polarized glasses appear to have different lightnesses when illuminated with polarized light that is absorbed by one lens but passes through the other.

A classifier 150 is trained to input the feature vector 148 and produce an eyeglass classification 168.

Viewing Recommendations

Referring again to FIG. 1, the display system is capable of issuing viewing recommendations to a viewer. For example, when the image 10 is analyzed to be an anaglyph image, a message can be communicated to a viewer such as "Please put on anaglyph glasses". The message can be rendered to the 2D/3D display 90 in text, or spoken with a text-to-speech converter via the speaker 344. Likewise, if the image 10 is a 2D image, the message is "Please remove anaglyph glasses". The message can be dependent on the analysis of the viewing region image 32. For example, when the eyewear classifier 40 determines that at least one viewer's eyewear is mismatched to the image's multi-view classification 68, then a message is generated and presented to the viewer(s). This analysis reduces the number of messages to the viewers and prevents frustration. For example, if an image 10 is classified as an anaglyph image and all viewers are determined to be wearing anaglyph glasses, then it is not necessary to present the message to wear proper viewing glasses to the viewers.

The behavior of the display system can be controlled by the set of user controls 60 such as graphical user interface, a mouse, a remote control of the like to indicate user preferences 62. The behavior of the system is also affected by system parameters 64 that describe the characteristics of the displays that the display system controls.

The image processor 70 processes the image 10 in accordance with the user preferences 62, the viewer(s)' indicated preferences 42, the multi-view classification 68 and the system parameters 64 to produce an enhanced image 69 for display on the 2D/3D display 90.

When multiple viewers are present in the viewing region, the indicated preferences 42 can be produced for each viewer, or a set of aggregate indicated preferences 42 can be produces for a subset of the viewers by, for example, determining the indicated preferences that are preferred by a plurality of the viewers.

Example Actions and Recommendations

When indicated preferences 42 show that the viewers are wearing corrective lenses, no glasses, or sunglasses (i.e. something other than stereo glasses), then the image processor 70 uses information in the system parameters 64 to determine how to process the images 10. If the image 10 is a single-view image, then it is displayed directly on a 2D display 90 (i.e. the enhanced image 69 is the same as the image 10). If the image 10 is a multi-view image, then the image 10 is either converted to a 2D image (discussed hereinbelow) to produce an enhanced image, or the image is displayed on a 3D display (e.g. a lenticular display such as the SynthaGram). The decision of whether to display the image as a 2D image or a 3D image is also affected by the indicated preferences 42 from the gestures of the viewers (e.g. the viewer can indicate a reference for 3D). If the image 10 is an anaglyph image, the image processor 70 produces an enhanced image 69 that is a 2D image by, for example, generating a grayscale image from only one channel of the image 10.

When indicated preferences 42 show that the viewers are anaglyph glasses, then the image processor 70 uses information in the system parameters to determine how to process the images 10. If the image 10 is a single-view image, then the system presents the viewing recommendation 47 to the viewer(s) "Please remove anaglyph glasses" and proceeds to display the image 10 on a 2D display. If the image 10 is a stereo or multi-view image including multiple images of a scene from different perspectives, then the image processor 70 produces an enhanced image 69 by combining the multiple views into an anaglyph image as described hereinabove. It the image 10 is an anaglyph image, and the 2D/3D display 90 is a 3D display, then the action of the image processor depends on the user preferences 62. The image processor 70 can switch the 2D/3D display 90 to 2D mode, and display the anaglyph image (which will be properly viewed by viewers with anaglyph glasses). Or, the image processor 70 produces an enhanced image 69 for display on a lenticular or barrier 2D/3D display 90. The channels of the anaglyph image are separated and then presented to the viewers via the 2D/3D display 90 with lenticles or a barrier so that anaglyph glasses are not necessary. Along with this processing, the viewers are presented with a message that "No anaglyph glasses are necessary".

Table 1 contains a nonexhaustive list of combinations of multi-view classifications 68, eyewear classifications by the eyewear classifier 40, indicated preferences 42 corresponding to gestures detected by the gesture detector 38, the corresponding viewing recommendations 47 and image processing operations carried out by the image processor 70 to produce enhanced images 68 for viewing on the 2D/3D display 90. Note that when the image analyzer detects no people or no gestures, it defaults to a default mode where it displays the image 10 as a 2D image or as a 3D image according to system parameter. Note also that the image processor 70 sometimes merely produces an enhanced image 69 that is the same as the image 10 in an identity operation.

TABLE 1

Exemplary display system behaviors

| Multi-view classification | Eyewear classification | Gesture | System Parameter | Image processing | Viewing Recommendation |
|---|---|---|---|---|---|
| Single view | Anaglyph glasses | None | 2D monitor | Identity | "remove anaglyph glasses" |
| Anaglyph image | No glasses | None | 3D lenticular monitor | Anaglyph to Stereo | |
| Stereo pair | Anaglyph glasses | None | 2D monitor | Stereo to anaglyph | |
| Anaglyph image | No glasses | None | 2D monitor | Anaglyph to Single View | |
| Stereo pair | Anaglyph glasses | None | 3D lenticular monitor | identity | "remove anaglyph glasses" |
| Single view | No glasses | 3D | 3D lenticular monitor | Single View to Stereo pair | |
| Anaglyph image | Polarized glasses | None | Polarized projector | Anaglyph to stereo | |
| Stereo pair | None | 2D | 3D lenticular monitor | Stereo to single view | |

The image processor 70 is capable of performing many conversions between stereo images, multi-view images, and single-view images. For example, the "Anaglyph to stereo" operation is carried out by the image processor 70 by generating a stereo pair from an anaglyph image. As a simple example, the left image of the stereo pair is generated by making it equal to the red channel of the anaglyph image. The right image of the stereo pair is generated by making it equal to the blue (or green) channel of the anaglyph image. More sophisticated conversion is accomplished by also producing the green and blue channels of the left stereo image, and producing the red channel of the right stereo image. This is accomplished by using a stereo matching algorithm to perform dense matching at each pixel location between the red and the blue channels of the anaglyph image, Then, to produce the missing red channel of the right stereo pair, the red channel of the anaglyph image is warped according to the dense stereo correspondence. A similar method is followed to produce the missing green and blue channels for the left image of the stereo pair.

The "Stereo to Anaglyph" operation is carried out by the image processor 70 by producing an anaglyph image from a stereo pair as known in the art.

The "Anaglyph to single view" operation is carried out by the image processor 70 by a similar method as used to produce a stereo pair from an anaglyph image. Alternatively, the single view is produces a monochromatic image, by selecting a single channel from the anaglyph image.

The "single view to stereo pair" operation is carried out by the image processor 70 by estimating the geometry of a single view image, and then producing a rendering of the image from at least two different points of view. This is accomplished according to the method described in D. Hoiem, A. A. Efros, and M. Hebert, "Automatic Photo Pop-up", ACM SIGGRAPH 2005.

The "stereo to single view" operation is carried out by the image processor 70 by selecting a single view of the stereo pair as the single view image. Also, when the image 10 is a stereo or multi-view image, the image processor 70 can compute a depth map for the image 10 using the process of stereo matching described in D. Scharstein and R. Szeliski, A taxonomy and evaluation of dense two-frame stereo correspondence algorithms, International Journal of Computer Vision, 47(1/2/3):7-42, April-June 2002. The depth map contains pixels having values that indicate the distance from the camera to the object in the image at that pixel position. The depth map can be stored in association with the image 10, and is useful for applications such as measuring the sizes of objects, producing novel renderings of a scene, and enhancing the visual quality of the image (as described in U.S. Patent Application No. 2007/0126921 for modifying the balance and contrast of an image using a depth map). In addition, an image with a depth map can be used to modify the perspective of the image by, for example, generating novel views of the scene by rendering the scene from a different camera position or by modifying the apparent depth of the scene.

The image processor 70 carries out these and other operations.

Glasses that Detect Stereo Images

In another embodiment, the viewer wears glasses that automatically detect when a stereo, 3D or multi-view image is presented to the viewer, and if so, adjusts either the left lens or the right lens or both to permit the user to perceive depth from the stereo image. For example, when an anaglyph image comes into the field of view of a viewer wearing the glasses, the glasses detect the anaglyph and modify their lens transmittance to become anaglyph glasses. This enables stereo perception of the image without requiring the viewer to chance glasses, and does not require communication between the glasses and the image display. Further, the glasses contain lenses with optical properties that can be modified or controlled. For example, a lens controller can modify the lens transmittance only for the portion of the lens required to view the anaglyph image, maintaining normal viewing for viewable regions of the scene that are not the anaglyph image.

FIG. 4 shows glasses 160 in various configurations. In FIG. 4A, the glasses 160 are shown in a normal viewing mode. In normal viewing mode, both lenses are clear (i.e. each lens is approximately equally transmissive to visible light). Note that the lenses can be corrective lenses. The glasses 160 can contain an integral image capture device 108 to capture an image of the scene roughly spanning the viewing angle of the human wearer.

Figure 4A:
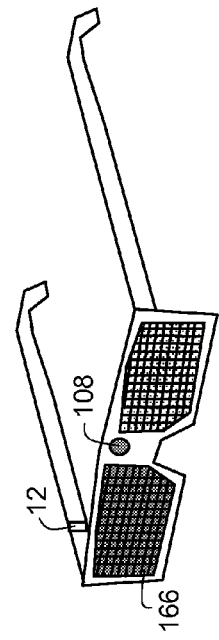
FIGS. 4A-4E show glasses containing a material with controllable optical density.
Figure 4B:
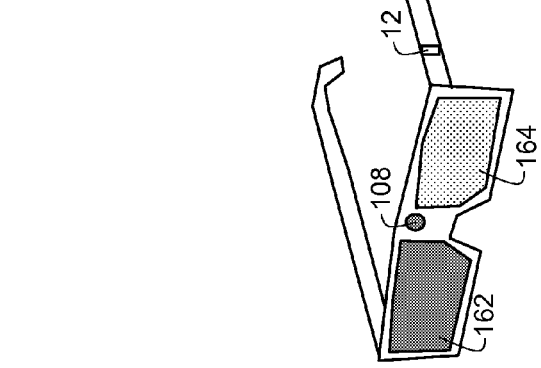
Figure 5:
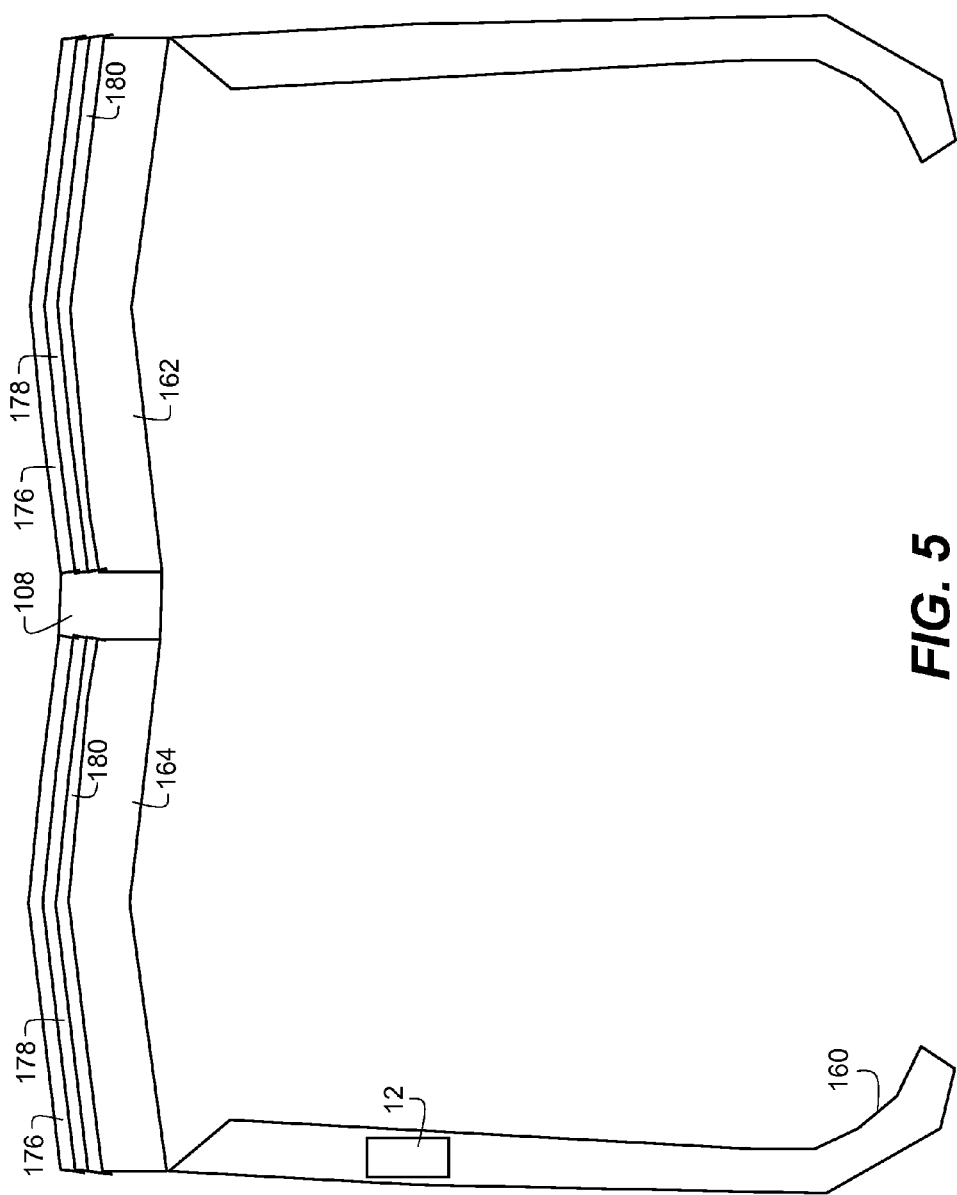
FIG. 5 shows glasses containing a material with controllable optical density.

The glasses 160 contain the digital processor 12 capable of modifying an optical property of a lens, such as modifying the transmissivity to incident light of each lens. For example, a lens can be darkened so that only 50% of incident light passes and the other 50% is absorbed. In the preferred embodiment, the modification of the transmissivity of the lens varies for different wavelengths of visible light. For example, a left lens 164 can either be clear (highly transmissive), or when the appropriate signal is sent from the digital processor 12, the transmittance of the left lens 164 is modified so that it is highly transmissive for red light, but not as transmissive for green or blue light as shown in FIG. 4B. In another embodiment, the transmissivity of a lens is adjusted to permit higher transmittance for light having a certain polarity than for light with the orthogonal polarity. In other words, the lenses have optical density that is adjustable. The lenses of the glasses 160 contain a material to permit the digital processor 12 to control the optical density of each lens. As shown in FIG. 5, the glasses 160 contain the digital processor 12 and the left lens 164 and a right lens 162. Each lens contains one or more layers of material 176, 178, and 180 that are controllable to adjust the optical density of the lens. Each layer can adjust the optical density in a different fashion. For example, layer 176 can adjust the lens 164 neutral density; layer 178 can adjust the lens transmittance for a specific color (e.g. permitting red or blue light to pass more easily than other wavelengths of light); and layer 180 can adjust the lens transmittance to light of a specific polarity. The material is selected from a group such as a, electrochromatic material, LCD, suspended particle device, or polarizable optical material. Preferably the material is electrochromatic material whose transmission is controlled with electric voltages.

Figure 6:
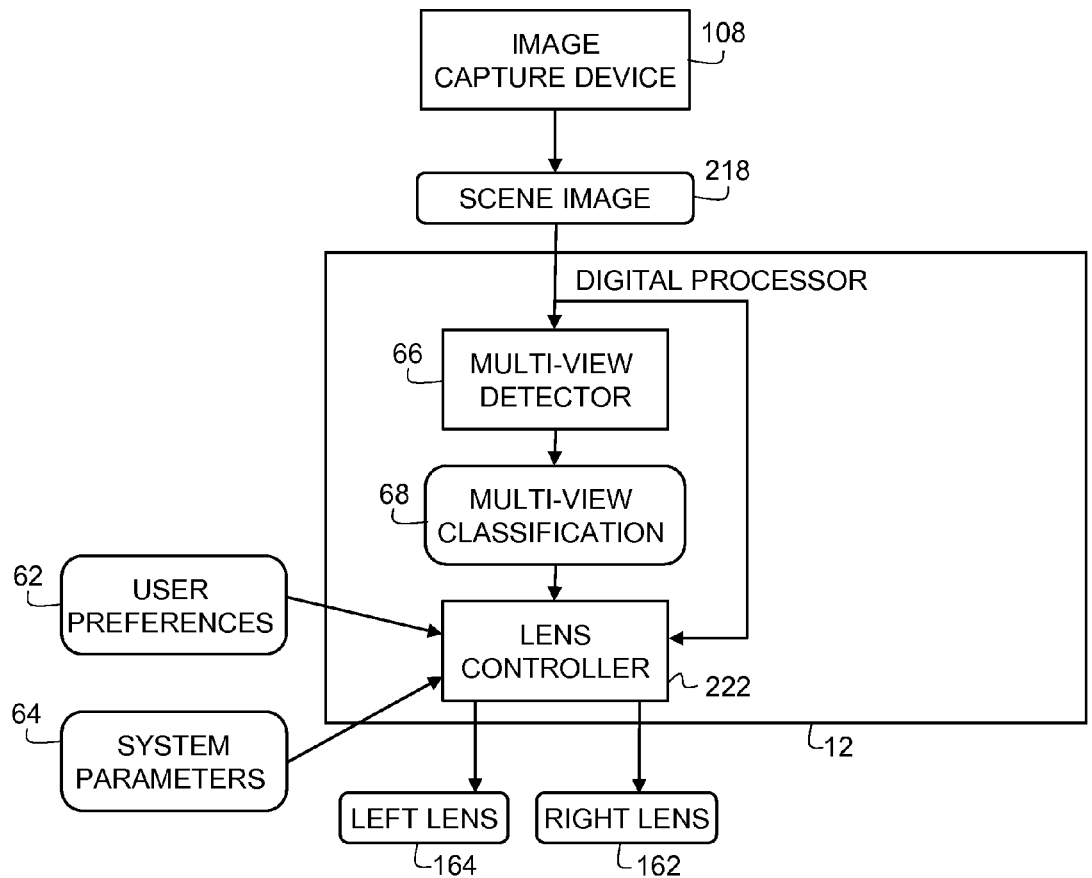
FIG. 6 shows a flowchart of the operation of the glasses.

As shown in FIG. 6, in the preferred embodiment, the glasses 160 contain the digital processor 12 and an image capture device 108 (e.g. containing an image sensor with dimensions 2000×3000) for capturing a scene image 218 that approximates the scene as seen by the viewer. The digital processor 12 analyzes the scene image 218 with the multi-view detector 66 to determine if the scene image 218 contains a multi-view image. The multi-view detector 66 analyzes portions of the scene image 218 using the aforementioned methods as described with respect to FIG. 2. The portions of the scene image 218 can be windows of various sizes of the scene image 218 (e.g. overlapping windows of dimensions 200×200 pixels, or by selecting windows at random from the image, or by selecting windows based on edge processing of the image). The multi-view classification 68 indicates which image portions were determined to be multi-view images. Note that the location of the multi-view portion of the scene image 218 is determined. For example, the multi-view classification indicates if an image portion is an anaglyph image, or a polarized stereo image. The glasses 160 can consider either one or multiple scene images captured with the image capture device 108 to determine the multi-view classification 68. For example, the image capture device 108 samples the scene faster than the rate at which left and right frames from a stereo pair are alternated on a display (e.g. 120 Hz). Then, the multi-view detector 66 computes features from the scene images 218 such as the aforementioned edge alignment features and the stereo alignment features. These features capture information that indicates if the scene image contains a page-flip stereo image, as well as captures the synchronization of the alternating left and right images in the scene. This permits a lens controller 222 to adjust the density of the left and right lens (164, 162) in synchronization with the image to permit the viewer to perceive depth.

In another example, the image capture device 108 captures scene images 218 through a set of polarized filters to permit the features of the multi-view detector to detect stereo pairs that are polarized images. In the event of a detected polarized stereo pair, the lens controller 222 adjusts the optical density of the lenses to permit the images of the stereo pair to pass to the correct eyes of the viewer.

Based on the multi-view classification 68, user preferences 62, and system parameters 64, the lens controller 222 controls the transmittance of left lens 164 and the right lens 162. For example, the left lens 164 is red and the right lens 162 is blue when the scene image 218 is determined to contain an anaglyph image.

Figure 4C:
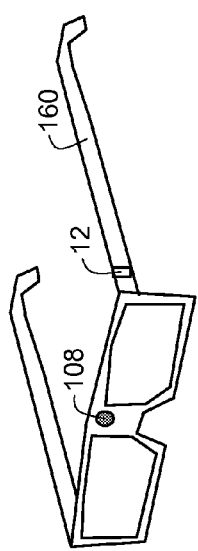
Figure 7:
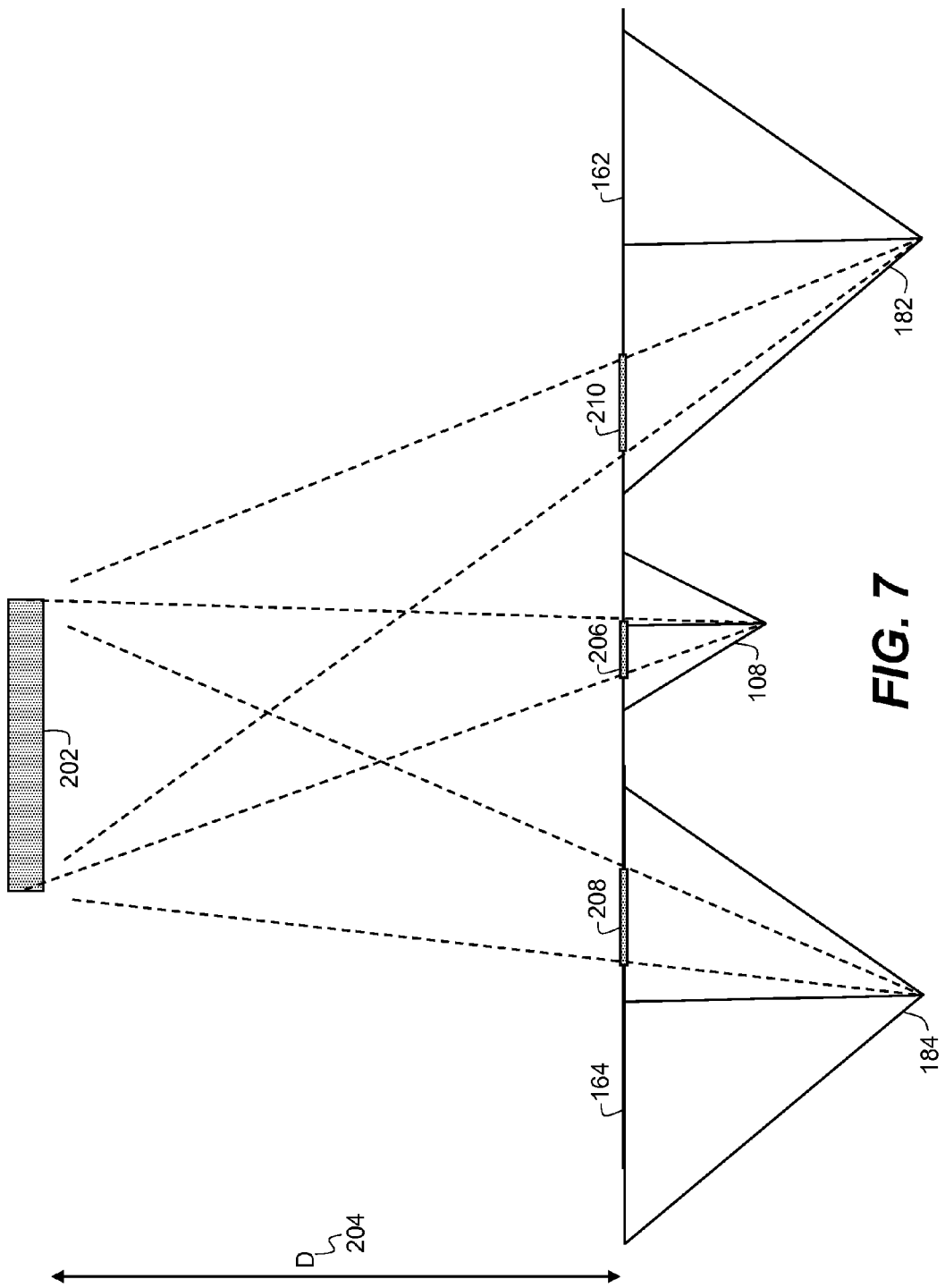
FIG. 7 illustrates the process for determining lens locations that correspond to a multi-view portion of a scene.

The lens controller 222 can control the optical density of any small region (pixel) 166 of each lens in an addressable fashion, as shown in FIG. 4C. The lens controller 222 is notified of the location of the multi-view image in the scene via a region map produced by the multi-view detector 66 of FIG. 6. The region map indicates the locations of multi-view portions of the scene image 218. The lens locations 170 are found for each lens that corresponds to the region of the scene image 218. FIG. 7 illustrates the method for determining the lens locations corresponding to regions in the scene image 218 that contain a multi-view image portion. The image capture device 108 images the scene containing a multi-view image portion 202. The region map indicates a region 206 of the multi-view portion of the scene image 218. By either estimating the physical size of the multi-view image in the scene 202 or the distance between the view for the left eye 184 and the right eye 182 and the multi-view image in the scene D 204, the lens locations 208 and 210 are determined that correspond to the multi-view portion of the scene. Typically, the distance D can be estimated to be infinity or a typical viewing distance such as 3 meters. When the glasses contain multiple image capture devices 108, then the distance D and the size of the multi-view portion of the scene can be estimated using stereo vision analysis. Then, the lens controller 222 modifies the corresponding lens location that corresponds to the region map, thus enabling the viewer to perceive the multi-view portion of the scene with the perception of depth.

The multi-view classification 69 can indicate that the scene image 218 contains multiple multi-view images. As shown in FIG. 4E, the transmittance of each lens at specific lens locations 172 and 174 can be modified in multiple regions to permit stereo viewing of multiple stereo images in the scene.

Figure 4D:
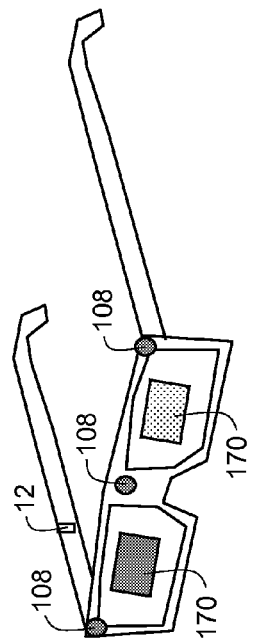
Figure 4E:
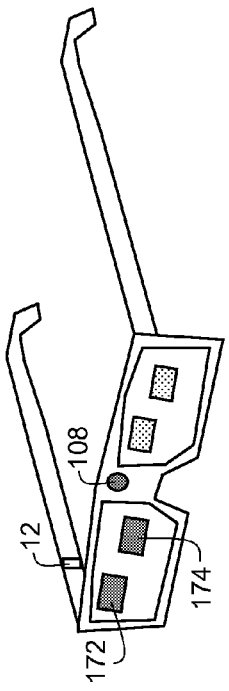

Note that as shown in FIG. 4D, the glasses 160 can contain multiple image capture devices 108 rather than just one. In some embodiments, this improves the accuracy of the multi-view detector 66 and can improve the accuracy for locating the regions in each lens corresponding to the potion of the scene image(s) that contain the multi-view image(s).

The invention is inclusive of combinations of embodiments described herein. References to "a particular embodiment" and the like refer to features that are present in at least one embodiment of the invention. Separate references to "an embodiment" or "particular embodiments" or the like do not necessarily refer to the same embodiments; however, such embodiments are not mutually exclusive, unless so indicated or as are readily apparent to one of skill in the art. The use of singular or plural in referring to the "method" or "methods" and the like is not limiting.

The invention has been described in detail with particular reference to certain preferred embodiments thereof, but it will be understood that variations and modifications can be effected within the spirit and scope of the invention.

PARTS LIST

| | |
|---|---|
| 10 | image |
| 12 | digital processor |
| 20 | image/data memory |
| 30 | image capture device |
| 32 | viewing region image |
| 34 | image analyzer |
| 36 | person detector |
| 38 | gesture detector |
| 40 | eyewear classifier |
| 42 | indicated preferences |
| 44 | preference database |
| 46 | appearance features |
| 47 | viewing recommendations |
| 49 | light source |
| 60 | user controls |
| 62 | user preferences |
| 64 | system parameters |
| 66 | multi-view detector |
| 68 | multi-view classification |
| 69 | enhanced image |
| 70 | image processor |
| 90 | 2D/3D display |
| 108 | image capture device |
| 120 | channel separator |
| 122 | image channel |
| 123 | file header |
| 124 | edge detector |
| 126 | feature extractor |
| 128 | feature vector |
| 130 | classifier |
| 142 | eye detector |
| 144 | eye comparer |
| 148 | feature vector |
| 150 | classifier |
| 160 | glasses |
| 162 | right lens |
| 164 | left lens |
| 166 | lens pixel |
| 168 | eyeglass classification |
| 170 | lens location |
| 172 | lens location |
| 174 | lens location |
| 176 | material |
| 178 | material |
| 180 | material |
| 182 | right eye |
| 184 | left eye |
| 202 | multi-view image in the scene |
| 204 | distance between viewer and multi-view image |
| 206 | a multi-view region of the scene image 218 |
| 208 | lens location corresponding to multi-view image in the scene |
| 210 | lens location corresponding to multi-view image in the scene |
| 218 | scene image |
| 222 | lens controller |
| 322 | memory |
| 324 | real-time clock |
| 328 | firmware memory |
| 329 | GPS unit |
| 340 | audio codec |
| 341 | general control computer |
| 342 | microphone |
| 344 | speaker |
| 350 | wireless modem |
| 358 | mobile phone network |
| 370 | internet |
| 375 | image player |
| 810 | lenticular display |
| 815 | L3 left eye image pixels |
| 818 | R3 right eye image pixels |
| 820 | lenticular array |
| 821 | cylindrical lens |
| 825 | eye pair L3 and R3 |
| 830 | eye pair L2 and R2 |
| 835 | eye pair L1 and R1 |
| 840 | light rays showing fields of view for left eye L3 for single cylindrical lenses |
| 845 | light rays showing fields of view for right eye R3 for single cylindrical lenses |
| 910 | barrier display |
| 915 | L3 left eye image pixels |
| 918 | R3 right eye image pixels |
| 920 | barrier |
| 921 | slot in barrier |
| 925 | eye pair L3 and R3 |
| 930 | eye pair L2 and R2 |
| 935 | eye pair L1 and R1 |
| 940 | light rays showing views of slots in barrier for L3 |
| 945 | light rays showing views of slots in barrier for R3 |

The invention claimed is:

1. Spectacles for use in viewing images or videos, comprising:

(a) at least two lenses each having an adjustable optical property;

(b) an image capture device associated with the spectacles for receiving a digital image comprising a plurality of digital image channels each containing multiple pixels;

(c) the image capture device capturing a digital image;

(d) a processor for computing a feature vector from pixel values of the digital image channels wherein the feature vector includes a feature value that is a function of a coincidence factor between edge locations in two or more digital image channels and the feature value indicates whether the digital image is an anaglyph or a non-anaglyph image;

(e) the processor producing an anaglyph classification by analyzing the digital image to classify the digital image as either an anaglyph or as a non-anaglyph based on the feature vector; and (f) the processor controlling an optical property of at least one of the two lenses based on the anaglyph classification.

2. The spectacles of claim 1, further comprising at least one lens having a coating of an electrochromatic material and the processor controlling the density of the lens using an electric voltage.

3. The spectacles of claim 1, further comprising:

(g) the processor (i) analyzing the digital image to produce a region map indicating likely regions in the image capture device's field of view that contain an anaglyph image;

(ii) determining lens locations for at least one lens that corresponds to the region map; and (iii) controlling an optical property of the at least one lens in the determined lens locations.

4. The spectacles of claim 1, wherein the spectacles contain two or more image capture devices for producing digital images.

5. The spectacles of claim 4, further comprising:

(g) the processor analyzing the digital images from at least two image capture devices to produce lens locations for at least one lens that corresponding to regions that contain an anaglyph image; and (ii) controlling the density of the at least one lens in the determined lens locations.

6. The spectacles of claim 1, wherein the feature vector produced in step (d) includes:

(i) defining a pixel neighborhood;
(ii) calculating a difference between the pixel values in the neighborhood; and
(iii) producing a feature value that is a function of the calculated difference.

7. The spectacles of claim 1, wherein the feature vector produced in step (d) includes:
(i) defining a pixel neighborhood;
(ii) calculating a correlation between the pixel values in the neighborhood from one digital image channel with the pixel values from another digital image channel; and
(iii) producing a feature value that is a function of the calculated correlation.

8. The spectacles of claim 1, wherein the optical property that is controlled is the transmittance to a specific color of light.

9. The spectacles of claim 8, wherein the processor controls both lenses and one lens is adjusted to be highly transmissive to red light but not blue light, and the other is adjusted to be highly transmissive of blue light but not red light.

10. Spectacles for use in viewing images or videos, comprising:
(a) at least two lenses each having an adjustable optical property;
(b) an image capture device associated with the spectacles for receiving a digital image comprising a plurality of digital image channels each containing multiple pixels;
(c) the image capture device capturing a digital image;
(d) a processor for computing a feature vector from pixel values of the digital image channels wherein the feature vector includes a feature value that is a function of a coincidence factor between edge locations in two or more digital image channels and the feature value indicates whether the digital image is a multi-view image or a single-view image;
(e) the processor producing an multi-view classification by analyzing the digital image to classify the digital image as either an a multi-view image or a single-view image based on the feature vector; and
(f) the processor controlling an optical property of each of at least one of the lenses based on the multi-view classification.

11. The spectacles of claim 10, wherein the optical property that is controlled is the transmittance to a specific color of light, or a transmittance to a specific polarization of light.

12. The spectacles of claim 11, wherein the processor controls both lenses and one lens is adjusted to be highly transmissive to red light but not blue light, and the other is adjusted to be highly transmissive of blue light but not red light.

* * * * *